United States Patent
Mohamed et al.

(10) Patent No.: US 9,359,256 B2
(45) Date of Patent: Jun. 7, 2016

(54) USE OF SURFACTANT IN THE PREPARATION OF MODIFIED SULFUR AND SULFUR CEMENT

(71) Applicant: United Arab Emirates University, Abu Dhabi (AE)

(72) Inventors: Abdel-Mohsen Onsy Mohamed, Abu Dhabi (AE); Maisa Mabrouk El Gamal, Abu Dhabi (AE)

(73) Assignee: United Arab Emirates University, Abu Dhabi (AE)

( * ) Notice: Subject to any disclaimer, the term of this patent is extended or adjusted under 35 U.S.C. 154(b) by 0 days.

(21) Appl. No.: 14/480,351

(22) Filed: Sep. 8, 2014

(65) Prior Publication Data

US 2015/0027345 A1 Jan. 29, 2015

Related U.S. Application Data

(62) Division of application No. 12/989,623, filed as application No. PCT/IB2009/005338 on Apr. 21, 2009, now Pat. No. 8,859,719.

(30) Foreign Application Priority Data

Apr. 25, 2008 (GB) .................................. 0807612.7

(51) Int. Cl.
| | |
|---|---|
| *C04B 24/16* | (2006.01) |
| *C04B 28/36* | (2006.01) |
| *C04B 12/00* | (2006.01) |
| *C04B 103/40* | (2006.01) |
| *C04B 111/00* | (2006.01) |

(Continued)

(52) U.S. Cl.
CPC ................. *C04B 24/16* (2013.01); *B09B 1/008* (2013.01); *C01B 17/0243* (2013.01); *C04B 12/00* (2013.01); *C04B 28/36* (2013.01); *C01P 2002/88* (2013.01); *C01P 2004/03* (2013.01); *C01P 2006/36* (2013.01); *C04B 2103/406* (2013.01); *C04B 2111/00775* (2013.01)

(58) Field of Classification Search
USPC .................. 106/809, 823, 815, 736; 528/389; 427/138
See application file for complete search history.

(56) References Cited

U.S. PATENT DOCUMENTS

| | | |
|---|---|---|
| 1,307,920 A | 6/1919 | Nestell |
| 2,329,940 A | 9/1943 | Ponzer |
| 2,871,133 A | 1/1959 | Palonen et al. |

(Continued)

FOREIGN PATENT DOCUMENTS

| | | |
|---|---|---|
| DE | 199 34 167 A1 | 1/2001 |
| EP | 048106 A1 * | 1/1981 |

(Continued)

OTHER PUBLICATIONS

Abu-Zuhri et al., "Polarographic Study of Some Arylidene-2-Pyridylhydrazones," An-Najah J. Res., 1992, vol. II, No. 7, pp. 29-34.

(Continued)

*Primary Examiner* — Jun Li
*Assistant Examiner* — Karam Hijji
(74) *Attorney, Agent, or Firm* — Kilpatrick Townsend & Stockton LLP

(57) ABSTRACT

Use of a non-ionic surfactant in the preparation of modified sulfur and/or modified sulfur cement that may or may not be modified sulfur concrete.

18 Claims, 6 Drawing Sheets

(51) Int. Cl.
*B09B 1/00* (2006.01)
*C01B 17/02* (2006.01)

(56) References Cited

U.S. PATENT DOCUMENTS

| | | | |
|---|---|---|---|
| 2,991,154 A | 7/1961 | Patzias | |
| 3,459,717 A | 8/1969 | Signouret et al. | |
| 3,491,046 A * | 1/1970 | Pachuta | C08L 81/04 524/705 |
| 3,661,530 A | 5/1972 | Block | |
| 3,989,534 A * | 11/1976 | Plunguian et al. | 106/646 |
| 4,022,626 A | 5/1977 | McBee et al. | |
| 4,025,352 A | 5/1977 | Leutner et al. | |
| 4,031,184 A | 6/1977 | McCord | |
| 4,032,469 A | 6/1977 | Bartzsch | |
| 4,058,500 A | 11/1977 | Vroom | |
| 4,188,230 A | 2/1980 | Gillott et al. | |
| 4,219,515 A | 8/1980 | Helser et al. | |
| 4,225,353 A * | 9/1980 | Beaudoin et al. | 106/275 |
| 4,250,134 A | 2/1981 | Minnick | |
| 4,256,499 A | 3/1981 | Terrel | |
| 4,293,463 A | 10/1981 | Vroom | |
| 4,311,826 A | 1/1982 | McBee et al. | |
| 4,344,796 A | 8/1982 | Minnick | |
| 4,348,313 A | 9/1982 | McBee et al. | |
| 4,372,872 A | 2/1983 | Backlund | |
| 4,376,830 A | 3/1983 | Nimer et al. | |
| 4,376,831 A | 3/1983 | Woo | |
| 4,391,969 A | 7/1983 | McBee et al. | |
| 4,402,891 A | 9/1983 | Kachinski, Jr. | |
| 4,414,385 A | 11/1983 | Swanson | |
| 4,428,700 A | 1/1984 | Lennemann | |
| 4,496,659 A | 1/1985 | Nimer et al. | |
| 4,584,179 A | 4/1986 | Galli | |
| 5,173,044 A | 12/1992 | Neilsen | |
| 5,264,013 A | 11/1993 | Brentrup | |
| 5,678,234 A | 10/1997 | Colombo et al. | |
| 5,792,440 A | 8/1998 | Huege | |
| 5,962,630 A | 10/1999 | O'Brien et al. | |
| 6,153,004 A * | 11/2000 | Hayner | C08L 95/00 106/274 |
| 6,331,207 B1 | 12/2001 | Gebhardt | |
| 6,334,895 B1 | 1/2002 | Bland | |
| 6,416,691 B1 | 7/2002 | Pildysh | |
| 6,441,054 B1 * | 8/2002 | Ou et al. | 516/11 |
| 6,517,631 B1 | 2/2003 | Bland | |
| 6,613,141 B2 | 9/2003 | Key, Jr. | |
| 7,141,093 B2 | 11/2006 | Charette | |
| 7,549,859 B2 | 6/2009 | Dupuis | |
| 8,043,426 B2 | 10/2011 | Mohamed et al. | |
| 8,721,785 B2 | 5/2014 | Mohamed et al. | |
| 2003/0183069 A1 | 10/2003 | Bubits | |
| 2004/0010956 A1 | 1/2004 | Bubits | |
| 2007/0186820 A1 | 8/2007 | O'Hearn | |
| 2014/0154009 A1 * | 6/2014 | Ashtekar | C08L 95/00 404/72 |

FOREIGN PATENT DOCUMENTS

| | | |
|---|---|---|
| EP | 0 048 106 A1 | 3/1982 |
| EP | 0 292 285 A1 | 11/1988 |
| EP | 0 402 507 A1 | 12/1990 |
| EP | 0 484 001 A2 | 5/1992 |
| EP | 1 961 713 A1 | 8/2008 |
| GB | 1007336 | 10/1965 |
| JP | 6325254 | 9/1980 |
| JP | 62-62120 | 3/1987 |
| JP | 64-52891 A | 2/1989 |
| JP | 2005 279370 | 10/2005 |
| JP | 2006 255705 A | 9/2006 |
| WO | 80/01816 A1 | 9/1980 |
| WO | 03/076359 A1 | 9/2003 |

OTHER PUBLICATIONS

ACI Committee, "Guide for mixing and placing sulfur concrete in construction" Reported by ACI Committee 548, 1993 (ACI 548.2R-93), American Concrete Institute, Farmington Hills, Mich., USA.

Ballone, et al., "Density functional and Monte Carlo studies of sulfur. II Equilibrium polymerization of the liquid phase," Journal of chemical physics, 2003, vol. 119, No. 16, pp. 8704-8715.

Beaudoin, et al., "Durability of Porous systems impregnated with dicyclopentadiene-modified sulfur," The International Journal of Cement Composites and Lightweight Concrete, 1984, vol. 6, No. 1, pp. 13-17.

M. Fernandez Bertos et al., "A review of accelerated carbonation technology in the treatment of cement-based materials and sequestration of $CO_2$," Journal of Hazardous Materials, 2004, 8112, pp. 193-205.

Bordoloi et al., "Plastic sulfur stabilization by copolymerization of sulfur with dicyclopentadiene," Advances in Chemistry Series, 1978, No. 165, American Chemical Society, Washington, DC, pp. 31-53.

Blight et al.,. "Preparation and properties of modified sulfur systems," In New Uses of Sulfur—II, Advances in Chemistry Series, 1978, No. 165 American Chemical Society, pp. 13-30.

Carpenter, A.B., "Oriented overgrowths of thaumasite on ettringite," American Mineralogist, 1963, vol. 48, pp. 1394-1396.

Currell, B.R., "The importance of using additives in the development of new applications for sulfur," Symposium on new users, for sulfur and pyrites, Madrid, 1976, pp. 105-110.

Darnell et al., "Full-scale tests of sulfur polymer cement and non-radioactive waste in heated and unheated prototypical containers," EGG-WM-10109, 1992, Idaho Natl. Engineering Lab., Idaho Falls, Idaho, pp. 1-88.

Darnell, G. R., "Sulfur polymer cement, a new stabilization agent for mixed and Low-level radioactive waste," EGG-M-91419, 1991, Idaho Natl. Engineering Lab., Idaho Falls, Idaho, pp. 1-19.

Dow Technical Data Sheet for TRITONTM X-100 & X-100 CG Surfactant, Product Information, 4 pages.

Ecker et al., Bundesministerium fur Wirtschaftiche Angelenheiten, 1986, StraBenforschung Nr. (678), Schwefelbton im Strassenbau. (In German) "Sulfur Concrete in Road Constructions," pp. 1-92.

Feldman et al., "Some Factors affecting durability of sulfur impregnated porous bodies," Cement and Concrete Research, 1978, vol. 8, No. 3, pp. 273-282.

Ghorab et al., "Reuse of Cement Kiln Bypass Dust in the Manufacture of Ordinary Portland Cement," Polymer-Plastics Technology and Engineering Nov. 2004, vol. 43, Issue 6 pp. 1723-1734.

Helser et al, 1992, "Polymers for Subterranean Containment Barriers for Underground Storage Tanks (USTs)," Environmental and Waste Technology Center, Dec. 1992, Brookhaven National Laboratory, Upton, NY, pp. 1-52, BNL-48750.

Heiser et al, "A Process for solidifying sodium nitrate waste in polyethylene," Symposium on Environmental aspects of stabilization and solidification of hazardous and radioactive wastes, 1989, pp. 1-24, BNL-42564.

Jong et al., "Fiber reinforcement of concrete to enhance flexural properties," R1-8956, Bureau of Mines, Department of Interior, Washington, DC, 17 pages.

Kalb et al, "Comparison of modified sulfur cement and hydraulic cement for encapsulation of radioactive and mixed wastes," 1990, pp. 1-13, BNL-45163.

Kalb et al., "Modified sulfur cement encapsulation of Mixed Waste Contaminated Incinerator Fly Ash," Waste Management Journal, 1991, vol. 11, No. 3, pp. 147-153, Pergamon Press, NY.

Lageraaen et al, "Use of Recycled Polymers for Encapsulation of Radioactive, Hazardous and Mixed Wastes," Brookhaven National Laboratory, 1997, pp. 1-30, BNL-66575 Informal Report.

Lin et al, "Modifications of Sulfur Polymer Cement (SPC) Stabilization and Solidification (S/S) Process," Waste Management, 1995, vol. 15, Nos. 5/6, pp. 441-447.

Mansoori, G Ali, "Nanoscal Structures of Asphaltene Molecule, Asphaltene Steric-Colloid and Asphaltene Micelles & Vesicles,"

(56) References Cited

OTHER PUBLICATIONS

Extract from Principles of Nanotechnology, 2005, http://trigger.uic.edu/~mansoori/asphaltene. molecule_html, accessed on Mar. 22, 2011, pp. 1-6.
Masson et al., "Bitumen microstructure by, modulated differential scanning calorimetry," Thermochim Acta 374, 2001, pp. 105-114.
Masterton et al., Chemistry: Principles and Reactions, Third edition, 1997, pp. 159-169, Harcourt Brace College Publishers, Florida.
Mattus et al., "Evaluation of Sulfur polymer cement as a waste form for the immobilization of Low-Level Radioactive or Mixed Waste,", Oak Ridge National Laboratory, 1994, pp. 1-40, Oak Ridge, TN, ORNL/TM-12657.
Mayberry et al., Technical area status report for low-level mixed waste final waste forms, Aug. 1993, vol. 1 Mixed Waste Integrated Program, Office of Technology Development, US. Department of Energy, pp. 1-138, DOE MWIP-3.
McBee et al., "Corrosion-resistant sulfur concretes," Report of Investigation 8758, Bureau of Mines Report, Dept. of Interior, U.S. Bureau of Mines, 1983, pp. 1-31, Washington, D.C.
McBee et al., "Development of specialized sulfur concretes," Report of Investigation 8346, U.S. Department of the Interior, Bureau of Mines, 1979, pp. 1-26.
McBee et al., Abstract of "Modified-sulfur cements for use in concretes, flexible paving's, coatings, and grouts," Proceedings, 1981, SULFUR-81 International Conference on Sulfur, Calgary, 1 page.
McBee et al., "Sulfur," Kirk-Othmer Encyclopedia of Chemical Technology, 1985, vol. 23, pp. 1-37, Wiley & Sons, Inc.
McBee et al, "Modified-sulfur concrete technology," Proceedings, SULFUR-81, 1981, pp. 367-388, International Conference on Sulfur, Calgary.
Mehta et al., "Hydraulic Cements," Concrete, Microstructure, Properties and Materials, 2005, Third Edition, Chapter 6, pp. 203 and 204.
Mohamed et al., "Compositional control on sulfur polymer concrete production for public works," Sustainable Practice of Environmental Scientists and Engineers in Arid Lands, A.M.O., 2006, pp. 1-12, A. A. Balkema Publishers.
Mohamed et al., "Development of modified sulfur cement and concrete barriers for containment of hazardous waste in arid lands," Sustainable Development and Climate Change, Feb. 5-7, 2007, pp. 1-11, Doha, Qatar.
Mohamed et al., "Durability and leachability characteristics of modified sulfur cement and concrete barriers for containment of hazardous waste in arid lands," 1st Joint QP-JCCP Environment Symposium in Qatar, Sustainable Development and Climate Change, Feb. 5-7, 2007, pp. 1-12, Doha, Qatar.
Mohamed et al., "Evaluation of the Potential Use of Cement Kiln Dust as an Aggregate Material for Manufacturing of Sulfur Polymer Concrete," 10th Annual Uaeu Research Conference, Apr. 2009, pp. 1-8.
Mohamed et al., "Solidification/Stabilization Processes," Geoenvironmental Engineering, Developments in Geotechnical Engineering, 82, 1998, Chapter 20, pp. 529-557.
Mohamed et al., "Sulfur based hazardous waste solidification," Environmental Geology, Sep. 2007, vol. 53, No. 1, pp. 159-175, Springer-Verlag.
Mohamed et al., "Sulfur Harvesting: 1. Compositional control on sulfur polymer concrete production for public works," The Seventh Annual UAE University Research Conference Proceedings, 2006, Sat Apr. 27 15:45-16:00, pp. 1-10, Eng 131-Eng 140.
Mohamed et al., "Sulfur Harvesting: 2. Thermo-mechanical behavior of newly developed sulfur polymer concrete," The Seventh Annual UAE University Research Conference Proceedings, 2006, Sat Apr. 27 15:45-16:00, pp. 1-10, Eng 131-Eng 140.
Mohamed et al., (2006) "Thermo-mechanical performance of newly developed sulfur polymer concrete," Developments in Arid Regions Research, vol. 3, pp. 15-26.
Moriyama et al., "Incorporation of an evaporator concentrate in polyethylene for a BWR," Nuclear and Chemical Waste Management, 1982, vol. 3, Issue 1, pp. 23-28.
Nnabuife, Elias Lovet Chukwunonso, "Forest and agricultural residues may not be wastes," Nnamdi Azikiwe University, Awka, Nov. 28, 2001, pp. 1-54.
Ozdemir et al, "Separation of Pozzolonic Material from Lignitic Fly Ash of Tuncbilek Power Station," International Ash Utilization Symposium, 2001, pp. 1-8, Centre for Applied Energy Research, Univ. of Kentucky, Paper #45.
Pickard, S. S., "Sulfur Concrete at AMAX Nickel—A Project Case History," Concrete International: Oct. 1, 1984, vol. 6, Issue 10, pp. 35-41.
Sandrolini et al., "Sulfur-polymer matrix composites from particulate wastes: A sustainable route to advanced materials," Composites: Part A 37, 2006, pp. 695-702.
Sigma "ProductInformation" extract for Triton X-100 (RTM), 2 pages.
Sliva et al., 1996, "Sulfur Polymer Cement as a Low-Level Waste Glass Matrix Encapsulant," Pacific Northwest National Laboratory, Richland, Wash., pp. 1-130, PNNL-10947.
Soderberg, A. F. (1983) "A new construction material," Sudicrete, SUDIC, Calgary.
Standard Specification for Sulfur Polymer Cement and Sulfur Modifier for Us in Chemical-Resistant, Rigid Sulfur Concrete, American Society for Testing and Materials, Jan. 1999, pp. 1-2, ASTM C1159-98.
STARcrete, The Concrete Answer to Corrosion Problems, http://www.starcrete.com, STARcrete Technologies Inc., 2000, The first commercial sulfur concrete, 1 page.
STN Easy, Registry extract for Triton X-100 (RTM), 2009, 2 pages.
Sullivan et al., "Development and testing of superior sulfur concretes," Report of Investigations 8160, 1976, pp. 1-35, Bureau of Mines Report, U.S. Dept of Interior, Washington, D.C.
Syroezhko et al., "Modification of Paving Asphalts with Sulfur," Russian Journal of Applied Chemistry, 2003, vol. 76, No. 3, pp. 491-496.
"Types of Chemical Reactions: Synthesis Reaction," www.matthewstudenny.com, 2 pages.
Vroom, A.H., "Sulfur concrete goes global," Concrete International, Jan. 1998, vol. 20(1), pp. 68-71.
Yousri, Kh.M., "Prospects of Sulfur as a Construction Material in the U.A.E.," Abstract, Poster-E-31 at the 7th International Conference on Chemistry and Its Role in Development, Mansoura University, Apr. 14-17, 2003, 1 page.

\* cited by examiner

Pure elemental sulphur

Sulfur modified with bitumen

USE OF SURFACTANT IN THE PREPARATION OF MODIFIED SULFUR AND SULFUR CEMENT

FIELD OF THE INVENTION

The present invention relates to the use of a non-ionic surfactant in the preparation of modified sulfur. It also relates to modified sulfur and/or modified sulfur cement, such as modified sulfur concrete. It also relates to barriers and containment constructions comprising modified sulfur concrete, wherein the concrete comprises the non-ionic surfactant.

BACKGROUND OF THE INVENTION

Sulfur has a number of allotropic forms, including orthorhombic, amorphous and monoclinic forms, with specific gravities of 2.07, 2.046, and 1.96 $Mg/m^3$, respectively. Elemental (unmodified) sulfur undergoes a complex transition in two steps between allotropic forms, from liquid sulfur above the melting point at 119.2° C. to solid sulfur at room temperature (or below 95.5° C.). Upon solidification sulfur initially takes a monoclinic β-phase. It undergoes 7% contraction in volume compared with liquid sulfur. If elemental sulfur is used as a binder with mineral aggregates to form a sulfur concrete material, this contraction leads to sub-pressure in pores and on surfaces.

The tensile capacity of sulfur, which is only 0.3-0.4 MPa, is not capable of enduring the strain, and micro-cracking is inevitable. This opens up the elemental sulfur concrete material somewhat to moisture penetration.

On further cooling of the sulfur, the monoclinic (β-phase) transforms into the stable orthorhombic form (α-phase), at 95.5° C. This transition is rather rapid (less than 24 hours) and leads to a further decrease of volume by 6%. It causes strain on the binder and cracking within the material, whether volume compensation has been made at solidification or not. Historically, elemental sulfur concretes have failed (in the mechanical sense, due to disintegration) when exposed to humid conditions, repeated cycles of freezing and thawing and immersion in water.

In principle, there are two ways of treating this problem, relieving the material from imposed stress due to contraction; either by modifying the sulfur binder in such a way that it stays for a long time in the β-phase (the chemical way) or accepting the transition into the α-phase but preventing, at least for a long time, the sulfur binder from forming micro sulfur crystals which would cause contraction (the physical way). This is explained further in e.g. U.S. Pat. No. 4,293,463.

The chemical way is to combine sulfur with a modifying agent that chemically modifies the sulfur in order to inhibit transformation to the orthorhombic structure. Suitable substances that may be used for this include dicyclopentadiene, or a combination of dicyclopentadiene, cyclopentadiene and dipentene.

The physical way is to combine sulfur with a modifying agent that physically modifies the sulfur. Typically the modifying agent is an organic plasticizer. Usually it comprises a polymer such as an olefin hydrocarbon polymer (e.g. RP220 or RP020 produced by Exxon Chemical or Escopol).

A durable sulfur concrete material not only requires a stable binder but also a composition of aggregates and binder such that the full composite remains stable and durable (e.g. it has limited absorption) under fluctuating temperature and moisture conditions.

Aggregates have been the focus of many efforts in seeking a durable sulfur concrete product. For example, moisture absorption can be limited by the use of dense graded mineral aggregates, and proper composition design with binder, mixing and consolidation. The selection of different aggregates, which will be appropriate for each particular application, is necessary for a sulfur concrete material. To meet the requirement of durability, cleanliness and limits of harmful substances, the composite aggregates must meet the ASTM C 33 specifications according to the ACI Committee 548. To determine an aggregate's suitability for a particular use, it is recommended that preliminary testing be carried out for verification.

Corrosion resistant aggregates must be clean, hard, tough, strong, durable and free of swelling constituents. They should also resist chemical attacks and moisture absorption from exposure to acid and salt solutions. Moisture absorption and dissolution losses should not exceed 1% in a 24 hour period.

When clay is contained within solidified sulfur concrete, the clay is believed to have an absorptive capacity, which will allow water to permeate through the material. When clay absorbs water, expansion occurs, resulting in deterioration of the product. Thus, clay-containing aggregates should not be used in producing sulfur concrete without treatment for limiting the swelling capacity.

Sulfur concrete is prepared in a different way from Portland cement concrete. New gradation designs have been developed based on the technology for asphalt concrete. The intention was to develop aggregate mixtures with maximum density and minimum voids in the mineral aggregate, so that less sulfur is needed to fill the voids of the mixture. The optimum range for the sulfur content of the sulfur concrete is slightly less than the amount necessary to fill the aggregate to 100% saturation, yet high enough to keep the final void content less than 8%. This, in most cases, results in higher strength materials, because improved aggregate contact means less shrinkage after solidification.

The mineral filler forms, with the binder, the paste which coats and binds the coarse and fine aggregate particles to produce a strong and dense product. Fillers should (1) control the viscosity of the fluid sulfur-filler paste, workability and bleeding of the hot plastic concrete; (2) provide nucleation sites for crystal formation and growth in the paste and minimize the growth of large needle-like crystals; (3) fill voids in the mineral aggregate, which would otherwise be filled with sulfur, reducing hardening shrinkage and the coefficient of thermal expansion; and (4) act as a reinforcing agent in the matrix to increase the strength of the formation.

Therefore, to meet the above mentioned functions, the filler must be reasonably dense-graded and possibly finely divided, so as to provide a large number of particles per unit weight, especially to meet the function (2) as described above (provision of nucleation sites).

As the preceding discussion indicates, much research has focussed on physically controlling the adverse effects of sulfur concrete by controlling the aggregates. Such physically controlled materials are not always available, for instance in arid lands.

Various uses have previously been suggested for sulfur concretes, including commercial applications such as the construction of chemical vats, the encapsulation of radioactive waste or mixed wastes in sewage and brine handling systems, and electrolytic baths. Sulfur concretes have also been used by the Corps of Engineers in repairing dams, canal locks, and highways. The use of sulfur concrete materials as barrier systems has been accepted by the US Environmental Protection Agency.

Various uses have also previously been suggested for modified sulfur concretes, including rigid concretes, flexible paving, spray coating, grouts and the temporary containment of corrosive compounds such as acidic and salt solutions.

However, it has not been suggested to use such modified sulfur concretes to restrict permeation over a long time period. The restriction of permeation over a long time period may be useful in, for instance, waste containment. Thus, hazardous waste requiring long-term containment calls for a containment construction comprising a barrier that restricts permeation over a long time period. In this instance, the barrier can help to protect subsurface soils and groundwater from contamination by toxic substances in the hazardous material due to leaching and movement by ground water action. It can also provide a means for isolation and confinement of the toxic substances within their storage or disposal host environment.

Materials that are currently being used for this purpose include materials that have mainly been used in engineering practice such as hydraulic cement, clay based soil, thermoplastic organic binders and thermosetting organic binders. These materials are being utilized as containment barrier systems around hazardous materials being stored or disposed of in underground or surface excavations. Clay based soil barriers are generally used because of their low hydraulic conductivity. In arid land regions, where the clay materials are unavailable, prefabricated synthetic materials in combination with bentonite are generally used. It has been proposed to use ordinary and special cements and concretes but this approach has not proven entirely satisfactory.

Among the possible desirable properties for a barrier are the following. It should (1) form an impervious barrier to the action of ground and saline waters; (2) have a low leaching rate, particularly by ground or saline waters; (3) be relatively inert; (4) have good resistance to chemical and physical degradation and biological processes; (5) be compatible with the containment construction and any uncontained hazardous material in the host environment; (6) exhibit a long-term satisfactory behaviour as a barrier or backfill material in the storage or disposal environment; (7) be in plentiful supply and at a reasonable cost; and (8) be easy to handle and control from an operating and manufacturing point of view. Materials suitable for use as barriers for hazardous waste require hydraulic conductivity in the order of $10^{-9}$ m/s or less.

Some researchers have used sulfur to solidify liquid low-level radioactive waste. The solidified material is disposed in a landfill which uses e.g. clay based barrier systems and geosynthetics. Thus, the leaching of metals from the sulfur-based material has not been a major concern. In this scenario, one would expect that metals will be leached out from the sulfur matrix but be contained by the barrier system. In most cases the sulfur matrix has been prepared from molten sulfur without any chemical additives.

When researchers have attempted to use chemical additives for sulfur modification, durability of the sulfur concrete has been questionable because of the type of chemicals used. Long-term durability to chemical attacks and temperature has been examined but the necessary level of satisfaction for engineering applications has not been met.

SUMMARY OF THE INVENTION

It has surprisingly been found that surfactants which are non-ionic may advantageously be used in the modification of sulfur. Such surfactants, when used in combination with a mixture of oligomeric hydrocarbons, enable the production of modified sulfur that is useful, for instance, in the preparation of modified sulfur concrete. Modified sulfur concrete obtainable using a non-ionic surfactant in combination with a mixture of oligomeric hydrocarbons has surprisingly been found to possess excellent properties in terms of strength, durability and leachability, including a hydraulic conductivity in the order of $10^{-13}$ m/s. The use of such modified sulfur concrete is particularly advantageous in arid areas, where materials such as clay and other fine-grained soils are not readily available and are therefore usually expensive because they must be transported from remote locations. The excellent properties of the modified sulfur concrete of the present invention are also advantageous for waste containment, e.g. for containing hazardous chemical or radioactive waste.

Accordingly, the present invention provides the use of a non-ionic surfactant in the preparation of modified sulfur, and/or modified sulfur cement that may or may not be modified sulfur concrete.

The present invention also provides a process of producing modified sulfur, which process comprises mixing elemental sulfur, a mixture of oligomeric hydrocarbons and a non-ionic surfactant to produce a mix.

The present invention also provides modified sulfur, which comprises sulfur, a mixture of oligomeric hydrocarbons and a non-ionic surfactant, and the use of such modified sulfur in the preparation of modified sulfur cement which may or may not be modified sulfur concrete.

The present invention also provides a process of producing modified sulfur cement (or, if aggregates are present too, modified sulfur concrete), which process comprises mixing elemental sulfur and the modified sulfur of the present invention.

The present invention also provides modified sulfur cement (or, if aggregates are present too, modified sulfur concrete), which comprises elemental sulfur and the modified sulfur of the present invention. The modified sulfur concrete of the present invention is a high strength, essentially impermeable, acid and salt resistant material that is suitable for use in very aggressive environments. It provides a long-term, cost effective alternative to Portland concrete where protection by acid brick, coatings, linings or other protective systems is required in highly corrosive environments. A further advantage of the modified sulfur cement of the present invention is that it has thermoplastic properties. Thus, when it is heated above its melting point, it becomes liquid, and can be mixed with aggregates such as sand, soil or wastes, to produce modified sulfur concrete. On cooling the mix re-solidifies to form a solid monolith. Full strength is achieved in hours rather than weeks as compared to hydraulic cements. Further, no chemical reaction is required for setting as in hydraulic cements. This minimizes incompatibilities between binder and aggregate. In arid lands, where evaporation is very high, the use of hydraulic cement (for which the use of water is needed to hydrate the cement and produce a solid matrix) is hindered by the lack of water. As a result public works suffer from excessive shrinkage and loss of strength. However, sulfur cement production does not require water.

The present invention also provides the use of the modified sulfur concrete of the present invention as a barrier to restrict permeation of matter, and a barrier suitable for restricting permeation of matter, which barrier comprises the modified sulfur concrete of the present invention.

The present invention also provides a containment construction suitable for containing matter over a long time period, which construction comprises one or more barriers of the present invention.

The use of modified sulfur concrete of the present invention as a barrier to restrict permeation of matter, e.g. in a containment construction, is particularly advantageous in arid land because of the high temperature environment. It is also advantageous in view of the fact that clay materials are poorly available and subsurface soils in arid lands have a high hydraulic conductivity (in the order of $10^{-5}$ m/s). In addition, it is advantageous because synthetic materials are expensive, particularly in view of the quality control that would be needed, and the risk of accidents (e.g. material puncture) during construction that could lead to the escape of polluting leachetes.

DETAILED DESCRIPTION OF THE INVENTION

Figure 1:
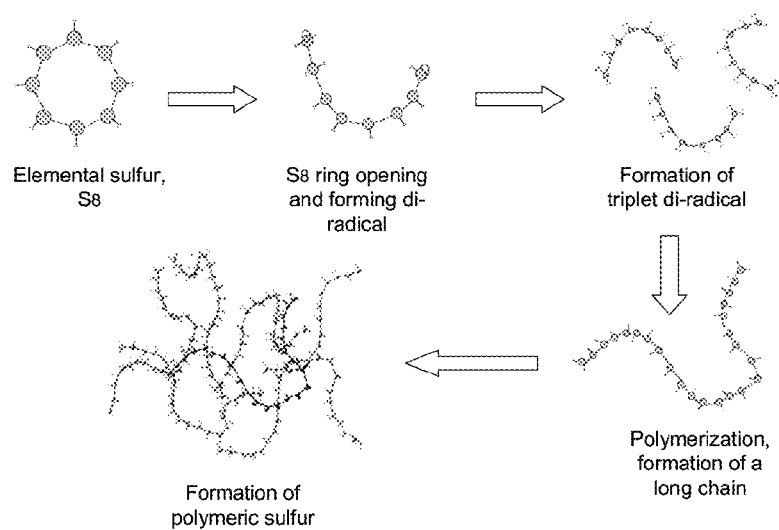
FIG. 1 illustrates a mechanism for sulfur polymerisation.

By "non-ionic" it is meant that the surfactant does not contain a head with a formal net charge.

The non-ionic surfactant is preferably an alkylaryloxy polyalkoxy alcohol.

The alkyl group in the alkylaryloxy polyalkoxy alcohol typically has up to 12 carbon atoms, such as 2 to 10, or 4 to 8 carbon atoms. It can be straight, though preferably it is branched. Preferably it is unsubstituted. Typically it is octyl, more typically iso-octyl.

The aryl group in the alkylaryloxy polyalkoxy alcohol typically contains from 6 to 10 carbon atoms. It can be a monocyclic ring, for example phenyl, or, unless otherwise specified, may consist of two or more fused rings, for example naphthyl. Preferably it is unsubstituted. Typically it is phenyl.

The alkoxy group in the alkylaryloxy polyalkoxy alcohol typically contains 1 to 4 carbon atoms, such as 2 or 3 carbon atoms. Preferably it is ethoxy.

The terminal alcohol moiety in the alkylaryloxy polyalkoxy alcohol typically has the same number of carbon atoms as the repeated alkoxy group. Preferably it contains 1 to 4 carbon atoms, such as 2 or 3 carbon atoms. Most preferably it is has 2 carbon atoms.

The polyethoxy section typically contains an average of 7 to 40 ethoxy units, preferably less than 30, more preferably less than 20, such as less than 10. In one embodiment the average number of ethoxy units is 9. In another embodiment the polyethoxy section contains an average of 5 to 15 ethoxy units.

The alkylaryloxy polyalkoxy alcohol can be a copolymer containing different types of alkoxy units, e.g. it may comprise a mixture of ethoxy and propoxy units.

Typically the alkylaryloxy polyalkoxy alcohol is an alkylphenoxy polyethoxy ethanol. Preferably the alkylphenoxy polyethoxy ethanol has the average formula $C_rH_{2r+1}(C_6H_4)O(CH_2CH_2O)_sCH_2CH_2OH$, wherein r is from 4 to 12 and s is from 7 to 40. r is preferably from 5 to 10, such as 7 to 9. In one embodiment r is from 4 to 8. Typically r is 8. s is preferably less than 30, more preferably less than 20 and typically less than 10. In one embodiment s is 9.

In one preferred embodiment the surfactant is iso-octylphenoxy polyethoxy ethanol. The non-ionic surfactant may, for instance, be Triton X-100®, which is manufactured by Rohm and Haas Company, Philadelphia, Pa.

The non-ionic surfactant is typically used in combination with a mixture of oligomeric hydrocarbons.

Various species may be present as oligomeric hydrocarbons. The mixture of oligomeric hydrocarbons typically comprises one or more polycyclic aromatic hydrocarbons. Thus, the mixture of oligomeric hydrocarbons can be a composition comprising one or more polycyclic aromatic hydrocarbons.

The polycyclic aromatic hydrocarbons for use in accordance with the present invention include, for instance, naphthalene, anthracene, phenanthrene, fluoranthene, naphthacene, chrysene, pyrene, triphenylene, benzofluorathene, perylene, pentacene, corannulene, benzo[a]pyrene, coronene and ovalene. Typically, the polycyclic aromatic hydrocarbons are one or more selected from naphthalene, anthracene, phenanthrene, fluoranthene, chrysene, pyrene, benzofluorathene, perylene and benzo[a]pyrene. In one embodiment phenanthrene and pyrene are used. Typically phenanthrene is used.

The polycyclic aromatic hydrocarbons for use in accordance with the present invention are unsubstituted or substituted. When substituents are present they are typically hydrocarbon substituents, such as alkyl, alkenyl and alkynyl substituents, though typically they are alkyl. The hydrocarbon substituents generally have 1-10 carbon atoms, typically 1-6 or 1-4 carbon atoms. The hydrocarbon substituents may be straight or branched. Preferred examples of the hydrocarbon substituent are methyl, ethyl, n-propyl, i-propyl, n-butyl, i-butyl, s-butyl and t-butyl. More preferred are methyl and ethyl. Most preferred is methyl.

The mixture of oligomeric hydrocarbons typically comprises one or more asphaltenes. Thus, the mixture of oligomeric hydrocarbons can be a composition comprising one or more asphaltenes.

The asphaltenes for use in accordance with the present invention are typically alkylated condensed aromatic rings. The asphaltenes are typically insoluble in n-heptane insoluble but soluble in toluene. The asphaltenes typically have a range of molecular masses from 400 to 1500 units. The most common molecular mass is typically around 750 units. A suitable method for checking molecular mass is ESI FT-ICR MS.

The mixture of oligomeric hydrocarbons typically comprises one or more alkanes. Thus, the mixture of oligomeric hydrocarbons can be a composition comprising one or more alkanes.

The alkanes for use according to the present invention can have varying numbers of carbon atoms, e.g. alkanes with up to 20 carbon atoms, 20-35 carbon atoms and/or 35 carbon atoms and above. The alkanes can be straight. Alternatively they can be branched, e.g. iso-alkanes.

In one embodiment the alkanes can be or include cycloalkanes, i.e. naphthenes. Naphthenes can be present instead of acyclic alkanes though typically both are present. The naphthenes can contain, for instance 3 or more rings, such as 4 or more, or 5 or more. In one aspect of the invention they contain less than 40 rings, such as less than 30, less than 20 or less than 10. The naphthenes can be unsubstituted or substituted with alkyl groups, wherein the alkyl substituents are the same as described above for the polycyclic aromatic hydrocarbons.

The mixture of oligomeric hydrocarbons typically comprises one or more resins. Thus, the mixture of oligomeric hydrocarbons can be a composition comprising one or more resins.

The mixture of oligomeric hydrocarbons may or may not comprise traces of metals such as iron, nickel and vanadium, and/or traces of non-metal elements such as oxygen, nitrogen, sulfur, phosphorous and halogens. When these non-metal elements are present they can appear at appropriate places within the hydrocarbon structures of the mixture of oligomeric hydrocarbons.

Preferably, the mixture of oligomeric hydrocarbons has an average degree of polymerization of 8 to 12, typically around 10. It is also preferred that the mixture of oligomeric hydrocarbons is a composition comprising one, more than one or all of polycyclic aromatic hydrocarbons, asphaltenes, alkanes (typically both acyclic and cyclic) and resins. Typically the mixture of oligomeric hydrocarbons is a composition comprising all of these, such as bitumen.

Bitumen is a black, oily, viscous material that is a naturally-occurring organic by-product of decomposed organic materials. It is obtainable from the bottom most fractions obtainable from crude oil distillation. It is too thick and sticky to flow, wholly soluble in carbon disulfide, and mostly made up of highly condensed polycyclic aromatic hydrocarbons.

The term "modified sulfur" refers to sulfur in which either (a) the amount of sulfur in the $\alpha$-phase is lower than that which would be observed if molten elemental sulfur was allowed to cool to room temperature on its own, or (b) the amount of sulfur in the $\alpha$-phase which is present in the form of micro crystals is lower than that which would be observed if molten elemental sulfur was allowed to cool to room temperature on its own. Typically in the modified sulfur the proportion of the sulfur that is not present in the $\alpha$-phase (i.e. the orthorhombic form) is at least 5%, such as at least 10% or at least 20%. More typically it is at least 30% or at least 40%. Preferably in the context of the present invention the modified sulfur satisfies both (a) and (b), and the proportion of the sulfur that is not present in the $\alpha$-phase (i.e. the orthorhombic form) is present predominantly as polysulfide instead. Thus, preferably the degree of polymerisation in the modified sulfur is at least 10%, such as at least 20 or 30. Typically it is at least 40%.

The term "modified sulfur cement" refers to sulfur cement that comprises modified sulfur. The term "modified sulfur concrete" refers to sulfur cement that further comprises aggregates.

The modified sulfur of the present invention typically comprises at least 90%, preferably at least 95%, typically less than 98% by weight of sulfur. Preferably it comprises 95-97.5% by weight of sulfur. The modified sulfur of the present invention typically comprises 0.01-0.05% by weight of the non-ionic surfactant, preferably 0.02-0.04% such as 0.02-0.03% or around 0.025%. The modified sulfur of the present invention typically comprises 1-5% by weight of the mixture of oligomeric hydrocarbons, preferably 2-4% such as 2-3% or around 2.5%.

Preferably the modified sulfur of the present invention comprises 95-97.5% by weight of sulfur, and 2.5-5% by weight of the total of bitumen and non-ionic surfactant components, based on the total weight of the modified sulfur.

In the process of producing modified sulfur, the preferred amounts of starting material to use essentially correspond to the amounts that are preferably present in the modified sulfur of the present invention. For example, in a preferred aspect the process of producing the modified sulfur comprises mixing elemental sulfur, bitumen and a surfactant wherein the elemental sulfur accounts for 95-97.5% by weight of the mixture and the total of the bitumen and surfactant components accounts for 2.5-5% by weight of the mixture.

The reaction time in the process of producing the modified sulfur is usually at least 30 minutes, though typically is less than 3 hours, more typically less than 2 hours. Preferably the reaction time ranges from 45-60 minutes. Reaction temperatures of 120-150° C. are generally used, preferably 130-140° C. Typically temperatures of 135-140° C. are used. Most preferably a temperature of around 140° C. is used.

After heating and mixing, the process preferably comprises cooling the mixture. The cooling can be carried out by simply leaving the mixture to cool to the surrounding temperature of its own accord or by actively inducing and/or controlling the cooling in some way. Typically a cooling rate of less than 5° C. per minute, such as less than 2 or 3° C. per minute, preferably around 1° C. per minute is employed. Generally this cooling rate is used throughout the entire cooling process. The temperature measured to calculate the cooling rate is the mean temperature for the whole of the concrete.

In the casting step, the temperature of the mould is preferably higher than or equal to the temperature of the mixture being placed in it. Typically the temperature of the mould is higher than or equal to the most recent mixing temperature. In another preferred embodiment, vibration of the mixture can be used to produce a highly dense modified sulfur concrete. A curing time of 1 day is generally required before the modified sulfur concrete is suitable for contact with water and/or e.g. any waste that it is intended to restrict permeation of.

Suitable methods for forming modified sulfur cement are described in Mohamed et al, Compositional control on sulfur polymer concrete production for public works, The Seventh Annual UAE University Research Conference Proceedings 2006, Sat April 27 15:45-16:00, Eng 131-Eng 140.

In one preferred embodiment of the present invention, the modified sulfur is obtainable by a process of the present invention as defined herein.

In the process of producing modified sulfur, the non-ionic surfactant, in combination with the mixture of oligomeric hydrocarbons, physically modifies the sulfur by inducing sulfur polymerization. Thus, the resulting modified sulfur cement comprises polymerized sulfur. When polymerized sulfur is present the sulfur phase transformation ($\beta$ to $\alpha$) still occurs during cooling, but the polymerised sulfur acts as a compliant layer between the sulfur crystals, and so serves to mitigate the effect of the phase transformation.

In a preferred embodiment of the present invention the modified sulfur comprises 45-65%, preferably 50-60% and typically around 55% by weight of monoclinic sulfur and 35-55%, preferably 40-50% and typically around 45% by weight of polysulfide, based on the total weight of the sulfur component.

The degree of polymerization can be confirmed by analyzing the fraction of the product that is insoluble in carbon disulfide ($CS_2$) by column chromatography (HPLC Agilent 1100; column PLgel Mixed C, 300*7.5 mm*5 µm, flow rate of 1 ml/min in chloroform, at room temperature 24° C.).

Typically both low and high molecular weight fractions of polysulfides are present in the modified sulfur of the present invention. The weight average molecular weight of the polysulfides is preferably from 10,000-30,000, typically 15,000-20,000. The average number molecular weight of the polysulfides present in the modified sulfur is typically 200-500, preferably 300-400. The poly-dispersability index of the polysulfides present in the modified sulfur, which is a reflection of the product molecular weight distribution, is preferably from 3-7, more preferably from 4-6, and typically 5.

In preparing the modified sulfur of the present invention, reaction of the non-ionic surfactant and the mixture of oligomeric hydrocarbons with the elemental sulfur (i.e. the degree to which they can disperse in each other) depends on how they interact. Types of interaction are: pi-pi bonding, polar or hydrogen bonding (polar interactions of hetero atoms) and Van Der Waals forces. Preferably the non-ionic surfactant is used in combination with bitumen, which when combined with sulfur allows the production of a homogeneous, self-compatible mixture consisting of a variety of molecular species that are mutually dissolved or dispersed. Typically this combination contains a continuum of polar and non-polar material. This leads to areas of order or structure of polysulfides in the modified sulfur, depending on the amount of the polymer present, the reaction time, the reaction temperature, and the cooling rate.

At heating temperature <140° C., elementary sulfur forms polysulfides. The mechanism believed to explain this process is depicted in FIG. 1. Essentially it takes place through initiation and propagation steps.

Initiation: cyclo-$S_8$→chain-$S_8$: (1)

Propagation: chain-$S_8$:→$S_{poly}$: (2)

Sulfur undergoes a liquid-liquid transition, usually interpreted as the ring opening polymerization of elemental sulfur $S_8$. An increase in temperature is accompanied by an increase in motion and the bond within the ring becomes strained and finally breaks. The covalent bond breaks equally in half, so a di-radical is formed. Ring opening gives rise to triplet di-radical chains. Polymerization then occurs to form long chains.

The modified sulfur of the present invention can be used in the preparation of modified sulfur cement, such as modified sulfur concrete. The process of producing modified sulfur cement comprises mixing elemental sulfur and the modified sulfur of the present invention as defined above. Preferably the process also comprises mixing an aggregate with the elemental sulfur and modified sulfur. In this case the modified sulfur cement product is modified sulfur concrete.

Thus, the modified sulfur cement of the present invention preferably comprises one or more types of aggregate. This further improves the strength and extends the utilization of the modified sulfur cement. Thus, the aggregates act as physical stabilizers. Modified sulfur cement comprising aggregates is modified sulfur concrete.

An aggregate is typically a strengthening material. Generally any material may be used as an aggregate so long as it does not adversely react with any of the other components of the sulfur cement. Thus, an aggregate serves a physical purpose in the cement rather than a chemical one and accordingly may comprise any inert particles so long as they are of appropriate size. Appropriate sizes are 0.01 to 1 mm, preferably 0.05 to 0.5 mm.

One possible type of aggregate is a waste material. This brings the extra advantage of finding a beneficial use for by-products of other industries that are generally unwanted and may otherwise require disposal. Examples include fly ash, slags from iron and steel making, non-ferrous slags, domestic refuse incinerator ash, overburden materials, dredged silts, construction rubble, waste water treatment sludges, and paper mill sludges. As these materials may include trace elements of potential pollutants and/or heavy metals (that can pose various environmental risks), care should be given before using them to assess the possible hazard expected during infiltration conditions.

The present invention has the advantage that there is no need to control the gradation of the aggregates. Thus, cheaper starting materials can be used. The use of aggregates can also further reduce costs, because cheap waste material can be used. Also, it adds significant strength thanks to the resulting grain structure.

Preferably, fly ash is used as an aggregate, i.e. the aggregate comprises fly ash. Fly ash is the ashy by-product of burning coal, also well-known as coal ash. Fly ash superior waste, which is a waste product of the nuclear industry, may also be used. Physically, fly ash is a very fine, powdery material. It is predominantly silica, with particles in the form of tiny hollow spheres called ceno-spheres. Type C fly ash is typically used, though other types such as type F may also be used. These two types of fly ash have pozzolanic properties, but type C fly ash is preferred because in the presence of water it hardens and gains strength over time. If the aggregate comprises fly ash, the fly ash typically accounts for at least 30%, preferably at least 40%, typically at least 50% of the aggregate.

Preferably, sand is used as an aggregate, i.e. the aggregate comprises sand. Sand is naturally occurring, finely divided rock, comprising particles or granules. The most common constituent of sand is silica (silicon dioxide), usually in the form of quartz, which because of its chemical inertness and considerable hardness, is quite resistant to weathering. If the aggregate comprises sand, the sand typically accounts for at least 25%, preferably at least 35%, typically at least 45% of the aggregate.

As is evident from the above discussion, many different types of compound may be used as aggregate, provided they do not interfere with the concrete formation process. To this end, the present invention has the advantage that it allows the use of undesirable materials, which are both cheap and may also otherwise require disposal, with an associated environmental and economical cost.

In one embodiment the present invention provides modified sulfur concrete wherein the aggregates comprise hazardous waste. Thus, the concrete, once set, has the hazardous waste embedded within it, i.e. the waste is contained by solidification.

In the modified sulfur concrete of the present invention, the amount of aggregate is generally at least 30%, preferably at least 40%, more preferably at least 50%, more preferably still at least 60% by weight based on the total weight of the resulting modified sulfur concrete. The amount of aggregate may be up to 85% or even up to 90 or 95% by weight based on the total weight of the resulting modified sulfur concrete. However, typically the amount of aggregate is less than 85%, preferably less than 80%, more preferably less than 75%, more preferably still less than 70% by weight based on the total weight of the modified sulfur concrete. Typically the amount of aggregate is 50 to 85%, more preferably 60 to 70% based on the total weight of the modified sulfur concrete.

In the modified sulfur cement of the present invention, the amount of elemental sulfur is generally at least 97%, preferably at least 98%, such as around 98.5 or 99% by weight based on the total weight of the modified sulfur cement.

In the modified sulfur concrete of the present invention, the amount of elemental sulfur is generally at least 20%, preferably at least 25%, more preferably at least 30% by weight based on the total weight of the modified sulfur concrete. The amount of elemental sulfur is generally less than 50%, preferably less than 45%, more preferably less than 40% by weight based on the total weight of the modified sulfur concrete.

In the present invention, the modified sulfur for use in preparing the modified sulfur cement (e.g. modified sulfur concrete) of the present invention will inevitably contain a certain amount of "unmodified" (i.e. unpolymerized) sulfur. However, when the amount of elemental sulfur in the modified sulfur cement (such as the modified sulfur concrete) is referred to herein, it refers to the amount of sulfur derived from elemental sulfur rather than from modified sulfur as a starting material.

In the modified sulfur cement of the present invention (which is preferably concrete), the amount of modified sulfur is generally at least 0.1%, preferably at least 0.25%, more preferably at least 1% by weight based on the total weight of the modified sulfur cement. The amount of modified sulfur is generally less than 3%, preferably less than 2%, more preferably less than 1.5% by weight based on the total weight of the modified sulfur cement.

In one preferred embodiment the present invention provides modified sulfur concrete which comprises 20-40% by weight of sand, 25-45% by weight of fly ash, 25-45% by weight of elemental sulfur and 0.25-2% by weight of modified sulfur as defined in any one of claims 12 to 15.

Of course, the modified sulfur cement of the present invention and the process for its preparation should comply with the international standards ACI 548.2R (Guide for Mixing and Placing Sulfur Concrete in Construction) and C1159-98R03 (Specification for Sulfur Polymer Cement and Sulfur Modifier for Use in Chemical-Resistant, Rigid Sulfur Concrete).

In the process of producing the modified sulfur cement (such as modified sulfur concrete) of the present invention, the preferred amounts of starting material to use essentially correspond to the amounts that are preferably present in the modified sulfur cement (such as modified sulfur concrete) of the present invention. For example, the process of producing modified sulfur concrete typically comprises mixing 20-50% by weight of the elemental sulfur, 50-80% by weight of the aggregate and 0.1-0.5% by weight of the modified sulfur, based on the total weight of the concrete. In this context, and in other aspects of the present invention, the number of significant figures quoted when specifying the percentage weights of given components within a given composition must be borne in mind. Thus, if 80 wt % of aggregate is used, the minimum amount of 20 wt % of elemental sulfur does not preclude the presence of a small amount (e.g. 0.1 wt %) of modified sulfur. As another example, in another preferred aspect the process of producing the modified sulfur concrete comprises mixing 20-40% by weight of sand, 25-45% by weight of fly ash, 25-45% by weight of elemental sulfur and 0.25-2% by weight of modified sulfur.

In the process of producing the modified sulfur cement (such as modified sulfur concrete) of the present invention, the mixture of elemental sulfur and modified sulfur (and if necessary the aggregate) can be heated to a temperature of 130-150° C., typically around 140° C., for 30 minutes to 2 hours, typically 1 to 1.5 hours.

In another embodiment the process of producing the modified sulfur cement (such as modified sulfur concrete) of the present invention comprises mixing together (i) the aggregate which has been pre-heated to a temperature of 170-180° C., typically around 175° C., and (ii) a mixture of the elemental sulfur and modified sulfur, which mixture has been pre-heated to a temperature of 130-150° C., typically around 140° C., and then subjecting the mixture of (i) and (ii) to a temperature of 130-150° C., typically around 140° C., for 20-40 minutes. The resulting mixture is then typically cast into moulds and allowed to cool. Temperature control is important because modified sulfur cement typically melts at 119° C. but above 149° C. its viscosity rapidly increases to an unworkable consistency.

The process of producing the modified sulfur concrete of the present invention can involve mixing the components in different orders. Preferably, the elemental sulfur and modified sulfur are mixed first, and the aggregate is added subsequently. If sand and fly ash are to be used as the aggregate, the fly ash is preferably added before the sand.

Preferably, the modified sulfur cement (such as the modified sulfur concrete) of the present invention is obtainable by one of the aforementioned processes. In one preferred embodiment the mixture is cast into a particular shape before being cooled, which shape produces a block of modified sulfur concrete suitable for use a barrier, which barrier is suitable for restricting permeation of matter.

When a preparation temperature of 130-140° C. is used to produce the modified sulfur cement of the present invention, this has the advantage that moisture and other volatile compounds contained in the waste are driven off, such that small quantities of moisture can be effectively volatilized during the process. The solidification concept of this process is to entrap the aggregates in the sulfur matrix and to immobilize them physically. Accordingly, in a preferred embodiment the modified sulfur cement of the present invention is modified sulfur concrete obtainable using a preparation temperature of 130-140° C.

As elemental sulfur for use in the present invention, standard elemental sulfur of any particular form may be used. The elemental sulfur may be commercial grade, crystalline or amorphous. Particle size is generally not significant and the sulfur may be used as either solid or liquid (molten) form, since the sulfur is melted during the preparation of sulfur cement.

The use of sulfur is advantageous as it provides a beneficial use for by-products of other industries which are produced at a rate which exceeds the current market demand. For instance, in the United Arab Emirates (UAE) large quantities of by-product sulfur are currently generated by the cleanup of hydrogen sulfide in the production of petroleum and natural gas. This sulfur may be used in accordance with the present invention.

The sulfur used according to the present invention typically has a granular shape and a purity of 99.9%. It is obtainable from, for instance, Al Ruwais refinery, UAE.

Containment constructions of the present invention may be produced by housing one or more barriers of the invention in a containment unit, with appropriately strong support and foundations. Preferably the containment construction of the present invention is suitable for use in arid land.

The barriers of the present invention are typically suitable for containing matter, such as hazardous waste, over a long time period. In this context, "long time period" is intended to reflect the fact that the permeation of matter through the barrier is not expected to be a limiting factor on the lifetime of the barrier. It is also intended to reflect the fact that disintegration of the barrier into its surrounding environment is not expected to be a limiting factor of the barrier. In other words, when the barrier is put in place, the functions of restricting permeation and minimal disintegration into the surrounding environment are expected to continue indefinitely for the lifetime of the barrier or for as long as the use is continued.

The long time period may, for instance, be at least 20 years, more preferably at least 50 years, more preferably still at least 100 years, such as at least 250, 500 or 1000 years. In one preferred embodiment the long period is essentially indefinite. Thus, typically the structure or construction of the present invention is arranged such that it is suitable for restricting permeation indefinitely.

The barrier of the present invention is suitable for containing matter such as hazardous waste. The term "suitable for containing matter" is intended to reflect the shape and dimensions of the barrier. Thus, the barrier of the invention should not have a shape that includes holes or gaps that defeat the object of containing matter. Typically a barrier of the present invention will be arranged and shaped so as to surround the matter to be held, with no gaps or holes in the structure in the parts of the barrier that are expected to come into direct contact with the matter to be contained. For instance, a barrier of the present invention may be shaped like a cup, flask or bowl, i.e. the sides and base have no gaps or holes and the top has an opening to allow insertion/removal of the matter to be contained. Alternatively it could be shaped like a box, cylinder, rod or flat sheet. However, a barrier of the present invention might feature a hole or gap in it if, for instance, it is intended to restrict permeation in one or more particular direction(s), in order to direct the fluid matter in another direction.

If the barrier of the present invention is to contain aggregates as hazardous waste (i.e. permeation out of the concrete is being restricted) then the shape of the barrier is not important, so long as the waste aggregates are effectively encompassed within the sulfur concrete. Of course, if the barrier of the invention is also to restrict permeation of material which is not part of the barrier itself (i.e. permeation both into and out of the concrete is being restricted) then the barrier is preferably arranged and shaped as described above.

Typically the barrier of the present invention is modified sulfur concrete obtainable or obtained by a controlled process that allows the formation of the modified sulfur concrete mixture into a predetermined shape. The shape formed in this way must have sufficient structural integrity to permit its handling in the subsequent operations without collapse.

Typically a barrier of the present invention is less than 1 m thick, in view of the extremely low hydraulic conductivity of the modified sulfur concrete of the present invention. Preferably the barrier is 0.3-0.9 m, more preferably 0.5-0.7 m thick.

Typically a barrier of the present invention is a monolith, i.e. a single solidified block. A containment construction of the present invention may comprise one or more barriers of the present invention, though typically just comprises one.

Preferably the barrier of the present invention serves to restrict permeation across the barrier of matter contained by the barrier. Thus, the barrier protects the surrounding environment from the matter it contains. However, as well as or instead of this, the barrier may serve to restrict permeation across the barrier of matter from the surrounding environment. Thus, the barrier can protect the matter it contains from the surrounding environment.

The barriers of the present invention are suitable for restricting permeation of matter, such as hazardous waste. By "hazardous waste", it is meant to refer to matter that could pose a danger due to being e.g. toxic, flammable, and reactive (e.g. oxidising or reducing), an irritant, carcinogenic, corrosive, infectious, teratogenic, mutagenic, explosive or radioactive, or could also refer to matter which has the potential to easily form hazardous waste. The waste could have a pH ranging from e.g. 2-13.

The barriers of the present invention are also suitable for exposure to a marine environment.

It will be clear from the context in which a given barrier or containment construction exploits the ability of the modified sulfur concrete of the present invention to restrict permeation whether or not that barrier or construction is suitable for containing matter over a long time period. For instance, a containment unit intended to house hazardous waste for an indefinite period (until or unless some other means of using or disposing of it may be found) will be built in such a way that reflects its potential permanent existence. For instance, it would probably be heavy duty and permanently set in position with very solid foundations. Such a containment unit would be classed as suitable for use in containing matter over a long time period.

On the other hand, a vat or reaction vessel employed in a factory for producing chemicals, or a storage tank for temporarily holding a chemical, for instance, would not be classed as suitable for containing matter over a long time period. This would be evident from e.g. the fact that they are not permanently set in position (as they would be expected to be replaced at some point) and would not have foundations built to last indefinitely (which would be unnecessary over-engineering given the purpose). Thus, they would not be built in a manner indicative that they could potentially be used indefinitely, so would not be suitable for indefinite use.

Figure 11A:
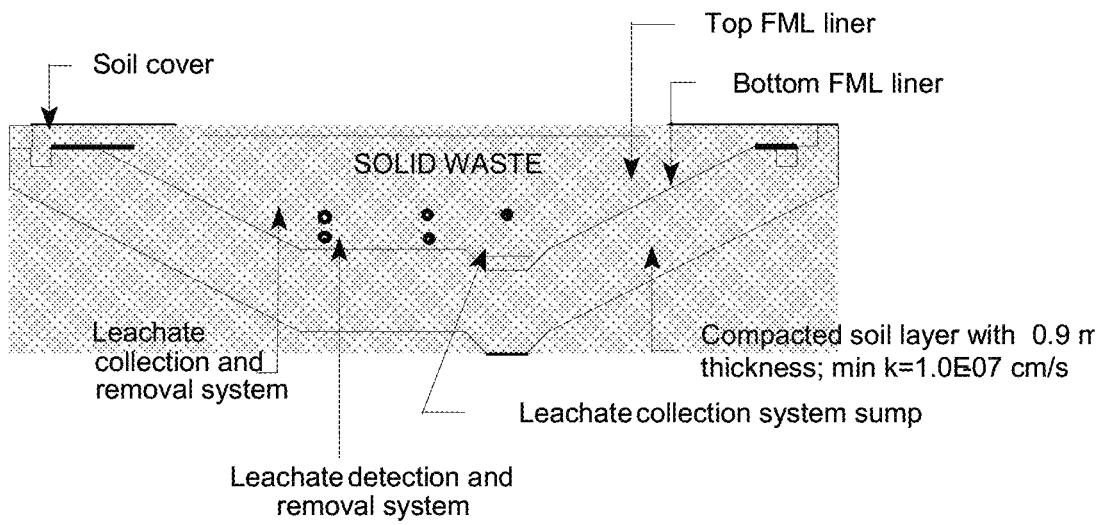
FIG. 11A shows the design of a typical hazardous waste containment construction.

As already noted, the barriers of the present invention may be used in the containment of hazardous waste. FIG. 11A shows the design of a typical hazardous waste containment construction. The US Environmental Protection Agency (EPA), for example, requires that the compacted clay liner be at least 0.9 m thick and have a hydraulic conductivity less than or equal to $10^{-9}$ m/s. Drainage layers are typically required to have a hydraulic conductivity greater than or equal to 1 cm/s, and a leak detection system capable of detecting a leak within 24 hours. Flexible membrane liners (FMLs) must be at least 0.76 mm thick.

Figure 11B:
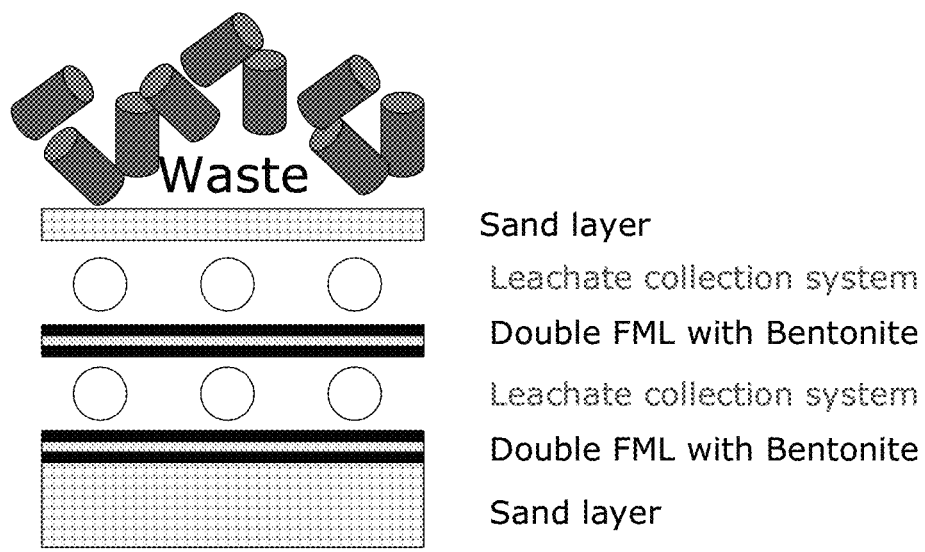
FIG. 11B shows the design of a typical hazardous waste containment construction that is for use in arid land.

FIG. 11B shows the design of a typical hazardous waste containment construction that is for use in arid land. The liner consists of a thin layer of clay sandwiched between two geotextiles or glued to a geomembrane. Various terms have been used to describe this material in the literature. The general term is double flexible membrane liner (DFML). The design mandates that in arid lands, two layers of DFML must be used to protect the ground water beneath the sand substrate. It is worth noting that synthetic materials are expensive, particularly with all the quality control/quality assurance required during construction. Also there is the risk of material puncture leading to the escape of hazardous leachetes, which could e.g. pollute the ground water bodies.

Figure 11C:
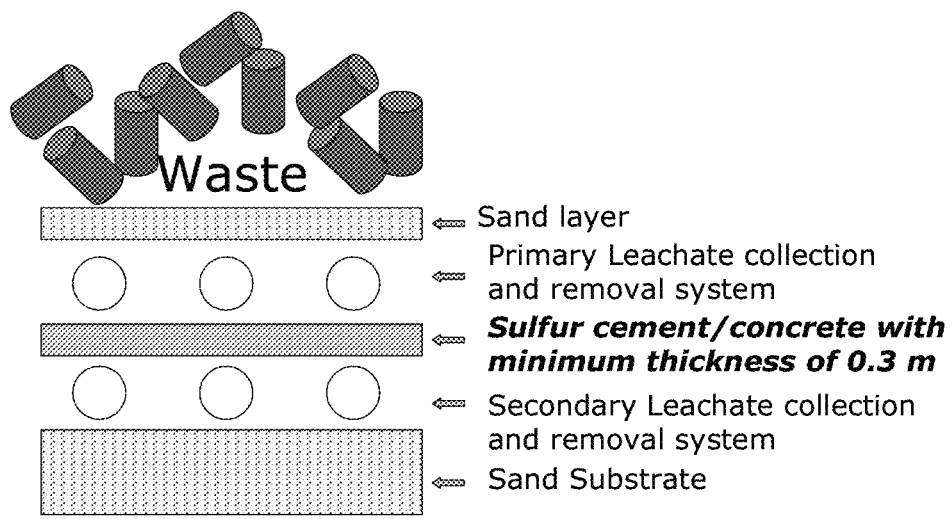
FIG. 11C shows the design of a new containment construction provided by the present invention.

FIG. 11C shows the design of a new containment construction provided by the present invention, which is suitable for the containment of hazardous waste in arid lands. The liner consists of a layer of modified sulfur cement/concrete with a minimum thickness of 0.3 m. Such material shall have a hydraulic conductivity in the order of $10^{-13}$ m/s, which is far less than the $10^{-9}$ m/s that specified by the US EPA. The liner (modified sulfur cement/concrete) is an inert material with a very low leaching rate in different environments such as neutral, acidic or alkaline media. It has a good resistance to chemical and physical degradation, so retains its strength in different environmental conditions. The use of this design will incur large savings and protect the human health and the environment in arid lands. Thus, the present invention provides a containment construction comprising one or more liner layers for restricting the permeation of matter (typically hazardous waste), said liner layers being less than 0.9 m thick, typically, less than 0.8 m thick, such as less than 0.7, 0.6 or 0.5 m thick. The minimum thickness is generally 0.3 m.

As has been explained above, the modified sulfur concrete of the present invention is particularly advantageous for use in arid land. In this context arid land refers to a land which is temperate, warm or hot, and has a ratio of annual precipitation to potential evapo-transpiration of less than 0.65. The modified sulfur concrete of the present invention is also advantageous for use in lands where the average amount of rainfall recorded is 10 days or less per year.

The following Examples illustrate the invention.

EXAMPLES

The physical, chemical and mechanical properties of sulfur concrete samples were studied.

Example 1

Preparation of Modified Sulfur

Sulfur modification was achieved by reacting sulfur, a modifying agent (bitumen) and a non-ionic surfactant (Triton X-100) to achieve the desired linear polysulfide products (which retard sulfur crystallization). The amount of polysulfide formed based upon the total amount of polymer present ranged from 1 to 5 wt %, and the reaction time ranged from 45-60 minutes at 140° C. The development of the to reaction was followed from changes in viscosity and homogeneity of the mixture.

The sulfur used was of a granular shape with purity of 99.9%, obtained from Al Ruwais refinery, UAE.

The modifying agent used was a polymer obtained from Geo-Chem Middle East, Dubai, UAE, and physically characterized by a specific gravity of 1.0289 g/cm$^3$, a Kinematics viscosity at 135° C. of 431 cSt (431 mm$^2$/s), and a softening point of 48.8° C. It contained 79% carbon, 10% hydrogen, 3.3% sulfur and 0.7% nitrogen.

The product, modified sulfur cement, was a mixture of polysulfide and un-reacted elemental sulfur, and possessed glass like properties. Un-reacted free sulfur is generally soluble in $CS_2$, while polysulfide is insoluble, although its insolubility depends on the extent of polymerisation and also the stirring rate and reaction time.

Thus, the percentage of sulfur present as polysulfide was estimated by examining the proportion of the reaction products which were extractable using $CS_2$. Column chromatography was used to determine the weight average molecular weight and number average molecular weight of polysulfide. Scanning electron microscopy was used to determine whether or not the free sulfur crystals were orthorhombic or monoclinic.

The structure of polysulfide, with a % yield of 43%, was confirmed by analyzing the fraction that was insoluble in $CS_2$ by column chromatography (HPLC Agilent 1100; column PLgel Mixed C, 300*7.5 mm*5 μm, flow rate of 1 ml/min in chloroform, at room temperature 24° C.). Analysis data indicated the presence of low and high molecular weight fractions of polysulfides with a weight average molecular weight of 17417 and an average number molecular weight of 344. The poly-dispersability index, which is a reflection of the product molecular weight distribution, was determined to be 5, confirming the presence of different polymer fractions.

As a consequence, the rheological properties of the sulfur were affected; hence the modified sulfur had a higher viscosity than unmodified sulfur. This has an important effect on the crystallization of sulfur. With the more viscous modified sulfur, in which the molecules are more polymerized, crystal growth is inhibited.

Figure 2A:
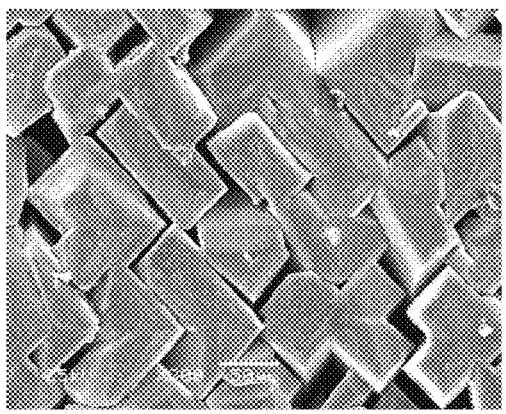
FIG. 2A and FIG. 2B give SEM images showing the difference between pure elemental sulfur and sulfur modified with bitumen, at the same heating and cooling conditions.
Figure 2B:
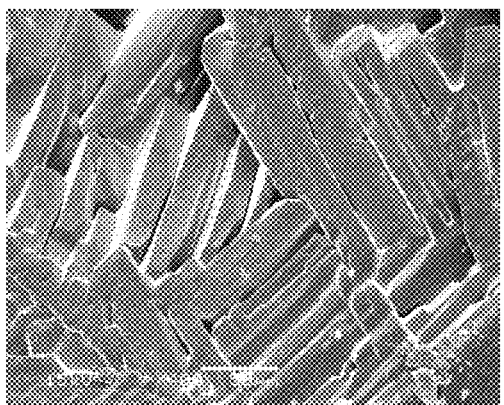

FIGS. 2A and 2B show that on heating of sulfur without polymer modification, alpha (orthorhombic form) sulfur crystals were formed, whereas upon modification of sulfur with a polymer modifying agent, the crystalline morphology was controlled and the dominant microstructure was plate like crystals of micron size. Such an interlocked microstructure provides ways to relieve stresses that develop during thermal expansion of sulfur.

Example 2

Preparation of Sulfur Concrete Samples

Sulfur concrete samples were prepared from sulfur, fly ash, sand and the modified sulfur of Example I according to the procedure described in ACI 248.2R-93 for mixing and placing sulfur concrete. The freshly prepared concrete was cast into moulds to form the desired concrete samples.

The sulfur used was of a granular shape with a purity of 99.9%, and was obtained from Al Ruwais refinery, UAE.

Chemical analysis of the fly ash used (India-97/591) was performed using Inductively Coupled Plasma-Atomic Emission Spectrometry (ICP-AES) VISTA-MPX CCD simultaneous. The fly ash mainly consisted of oxides of silica (60.9%), aluminum (32.4%) and iron (4.34%) with lesser amounts of calcium (0.46%), magnesium (0.66%) and potassium (0.027%). Since the value of SAF oxides (i.e., $SiO_2+Al_2O_3+Fe_2O_3$) was over 50%, it was classified as fly ash Type C according to ASTM C 618 (1980).

The sand used was desert sand obtained from a sandy dunes quarry in Al Ain area, UAE. Chemical analysis was performed using ICP-AES. The sand mainly consisted of oxides of silica (74.4%), calcium (16.35%) and lesser amounts of magnesium (1.158%), iron (0.676%), aluminum (0.47%), and potassium (0.13%). The sand was screened to obtain grain sizes ranging from 0.08 to 0.43 mm.

Samples of sulfur concrete were prepared with dimensions of 50×50×5 mm (cuboid), 50×50×50 mm (cuboid) and 38×77 mm (cylindrical). Setting or hardening of the samples took place on cooling to about 20° C.

Example 3

Characterisation of the Sulfur Concrete Samples

The sulfur concrete samples were subjected to numerous performance tests to determine their physical, chemical, stabilization, solidification, electrical and thermal properties, under anticipated storage and disposal conditions. Table 1 illustrates the physical and chemical properties determined. The samples tested had a high density structure with a comparable density to hydrated Portland cement. They should therefore provide similar radiation-shielding properties to hydrated Portland cement.

Analysis showed that the best concrete samples were composed of 34.4% sulfur (modified+unmodified), 36.4% fly ash, and 28.95% sand, i.e. they had a high aggregate content. However, they also met or exceeded the regulatory and disposal site acceptance criteria.

It was found that the hot mix could be poured at either very high or very low ambient temperatures without problems (as compared with hydraulic cement concrete, which cannot tolerate such temperature variation for the pouring step). Additionally it was found that the hot mix may be maintained in fluid form for many hours without deterioration.

TABLE 1

Physical properties of sulfur concrete, after three days cooling

| Property | Typical results |
|---|---|
| Density (ASTM C 642) | 2210-2370 kg/m$^3$ |
| Setting time | 30-60 minutes |
| Curing | Not required |
| Air content (ASTM C 642) | 4-8% |
| Max. Moisture absorption (ASTM C 128-97) | 0.17% |
| Max. Volumetric shrinkage | 1.69% |
| Electrical conductivity | Nonconductive |
| Max. service temperature | 85-90° C. |
| Flame spread classification | 0 |
| Fuel contributed | 0 |

Example 4

Mechanical Properties of the Sulfur Concrete Samples

It is important for the structures of the present invention to have high impermeability. Thus, any void spaces (pores) should not be connected, so less water can be absorbed. This phenomenon was prevented thanks to the sulfur modification which overcame the shrinkage problems associated with cooling.

It was found that the samples did not support combustion. Sulfur present at the surface of the samples burned slowly when exposed to direct flame but self extinguished when the flame was removed—the low thermal conductivity of sulfur results in slow penetration of heat.

Particular attention should be paid to the high compressive strength of the concrete samples (Table 2, for 50×50×50 mm sulfur concrete samples). The samples exhibited mechanical properties greater than Portland cement concrete. In as little as one hour, 80% of ultimate strength was achieved, and the samples were usually ready for use in less than one day. The fast curing property contributes to shortening construction period.

It was found that the concrete prepared according to Example 2 could be pre-cast easily into various shapes.

It was also found that the samples prepared had thermoplastic properties—they could be crushed, re-melted, re-formed without loss of strength or other properties.

TABLE 2

Mechanical properties of sulfur concrete, after three days cooling

| Property | Typical results |
|---|---|
| Compressive strength (ASTM C 39) | 50-54 MPa |
| Modulus of Elasticity | 1603 MPa |
| Flexural strength Standard EN 196/1 | 8.306 N/mm$^2$ |
| Maximum load at failure Standard EN 196/1 | 3.544 KN |

Example 5

Hydro-Mechanical Properties of the Sulfur Concrete Samples

The barriers of the present invention may be exposed to aqueous environments, and so the hydro-mechanical properties of samples were tested. The exposure of barrier materials to aqueous solutions can cause internal stresses with resultant cracking and strength losses in the barrier.

The effect of an aggressive environment on the samples was examined by immersing concrete samples in 98% sulfuric acid, 50% phosphoric acid, 30% boric acid and 10% acetic acid, for 7 days at 24° C. Hydraulic conductivity is the most important property for a containment barrier, as it is a measure of the rate that liquids will penetrate the barrier. Experimentally obtained results of the hydraulic conductivity of the samples were in the order of $10^{-11}$-$10^{-13}$ m/s. This indicated that the samples were impervious to water.

Table 3 summarizes some of the performance data for hydraulic conductivity (for 38×77 mm cylindrical sulfur concrete samples), loss in weights and in mechanical strength (for 50×50×50 mm sulfur concrete samples). Hydraulic conductivity was measured using a flexible membrane test apparatus. The data has revealed that the samples exhibit a high resistance to aggressive environments. It should be noted that under the same conditions Portland cement concrete, in most of these cases, is destroyed (McBee et al., Sulfur Construction Materials, Bulletin 678, U.S. Bureau of Mines, Washington D.C., 1985).

TABLE 3

Durability tests; hydraulic conductivity measurements, weight and compressive strength loss of samples after 7 days immersion in corrosive acids

| Acid type and concentration | Hydraulic conductivity (m/s) | Weight Loss (%) | Strength loss (%) |
|---|---|---|---|
| water | 1.456 × 10$^{-13}$ | 0.00 | 0.0 |
| 98% Sulfuric acid | 7.660 × 10$^{-11}$ | 0.23 | 13.5 |
| 50% Phosphoric acid | 3.103 × 10$^{-12}$ | 0.08 | 7.9 |
| 30% Boric Acid | 8.176 × 10$^{-13}$ | 0.07 | 4.0 |
| 10% Acetic acid | 2.196 × 10$^{-12}$ | 0.14 | 16.0 |

Example 6

Durability Performance—28-Day Immersion Test

Concrete samples of Example 1 were immersed in: (a) de-ionized water at different temperatures of 24, 40 and 60° C.; (b) saline solution of 3% NaCl at different temperatures of 40° C. and 60° C., and (c) acidic solution of 70% sulfuric acid at 40° C. All specimens were immersed for a period of 28 days. At the end of the test period, specimens were then air-dried in a ventilated hood for 24 hrs. The loss in weight was determined and compared with the values obtained with controlled samples (air), and compressive strength tests were conducted.

Figure 4:
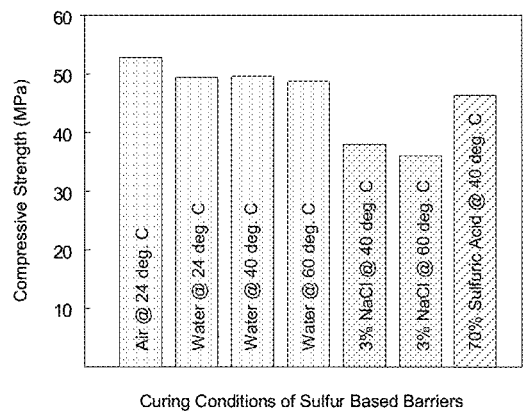
FIG. 4 shows 28-Day immersion test results obtained by subjecting samples of concrete structures of the present invention to different solution environments and different temperatures.

Comparison of these samples with companion samples kept in air indicated that; there was no observed cracking and dimensional changes were negligible for all samples. There was no loss in weight and no adverse effects in compressive strength for samples immersed in water at different temperatures as shown in FIG. 4. Although weight loss in samples immersed in saline solutions was almost insignificant, the samples showed a small to significant decrease in compressive strength with a maximum reduction for the samples that were immersed in 3% saline solution at 60° C. This could be attributed to the formation of sulfur gas and an increase in the amount of void spaces. Also, it may be the result of partial detachment between sulfur and the aggregates due to the presence of sodium chloride.

Example 7

Durability Performance—1 Year Immersion Test

50×50×50 mm modified sulfur concrete samples were tested to determine their durability in hydrates and in saline environments after immersion for one year at room temperature (24±2° C.). Samples were immersed continuously for up to 360 days in distilled water, and different saline solutions of 1% and 3% NaCl concentrations. These samples were compared with those kept in air. Periodically, during the course of the test, samples were visually inspected for shrinkage and cracks. In addition, after one year, the sulfur concrete samples were weighed and tested for their compressive strength and microstructure.

Figure 5:
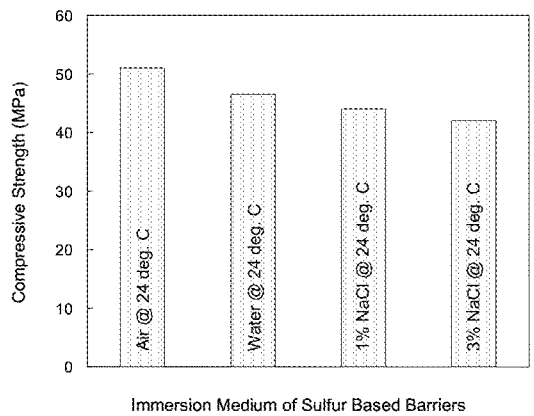
FIG. 5 shows 1 year immersion test results obtained by subjecting samples of concrete structures of the present invention to different saline solutions, at the same temperature.

FIG. 5 shows the compressive strength variations after the samples had been immersed in distilled water and in different saline solutions for one year. The results indicated that sulfur based barriers are corrosion-resistant and could be used in hydrated and salt environments. No deterioration was observed and only a limited loss in compressive strength was observed.

Figure 6:
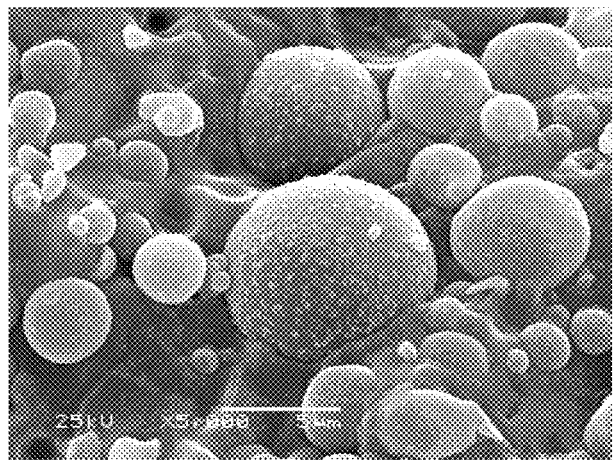
FIG. 6 is an SEM micrograph of a fracture 1 cm from the surface of a sample of the concrete of the present invention after immersion for one year in distilled water, showing a different coating of aggregate particles with sulfur.

A microstructure scan after immersion of specimens for one year in distilled water is shown in FIG. 6. It can be seen that in the presence of the water there is a tendency for the sulfur which coats the aggregates in the samples to be eluted from the aggregate surfaces. However, the use of modified sulfur cement resulted in an increase in the resistance of coated sulfur towards this elusion. This could be attributed to the presence of porous bodies impregnated with modified sulfur, which may have interactive forces different from those of ordinary sulfur which makes the modified sulfur less susceptible to damage from water (Feldman et al, Cem. Concr. Res., 8, 273-281 (1978); Beaudoin et al, The Int. Journal of Cement Compositions and Lightweight Concrete, 6(1), 13-17, (1984)).

Figure 3:
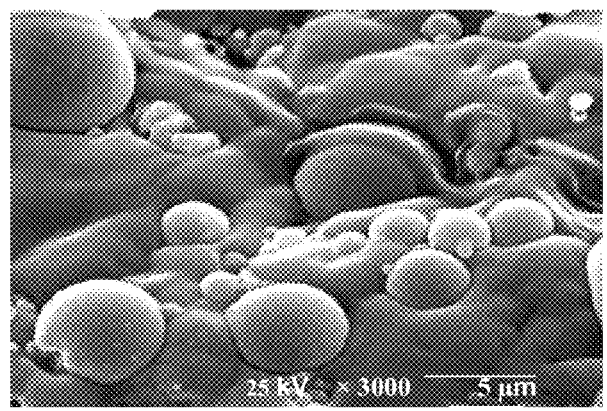
FIG. 3 is an SEM image illustrating how sulfur and modified sulfur bind, coat, and penetrates deep and between the aggregates.

FIG. 3 shows how the sulfur concrete samples formed a dense structure, with modified sulfur penetrating deep in between the aggregates by enfolding the aggregates with hydrophobic sulfur.

Example 8

Leaching Tests

The resistance of 50×50×5 mm modified sulfur concrete samples to corrosive environments was examined by testing samples in various aqueous environments. The samples were immersed in a transparent container filled with 1000 ml of tested aqueous environment. 1 ml from each aqueous solution was used for analysis by ICP for the determination of the total leaching of sulfur as sulfate, and metals such as calcium, magnesium, aluminium, and iron salts. Each test was run in duplicate to ensure reproducibility.

Leaching tests were conducted on concrete samples to evaluate the levels of environmentally hazardous metal contaminants that could be leached from the structures of the present invention. Chemical leaching of sulfur (as sulfates) from samples was measured using ICP-AES as discussed above. It is worth noting that since elemental sulfur exists in different allotropic forms with different densities, which are sensitive to cooling rates, it may cause micro-cracking and surface imperfections that provide excellent spots for oxidation. In the presence of oxygen and water, sulfur is slowly oxidized to sulfite and then to sulfate as shown by Eqs. 3 and 4 (Mattus and Mattus, 1994, Evaluation of Sulfur polymer cement as a Waste Form for the Immobilization of Low-Level Radioactive or Mixed Waste, ORNL/TM-12657, Oak Ridge National Laboratory, Oak Ridge, Tenn.).

$$S^0+O_2+2H_2O \rightarrow H_2SO_3 \quad (3)$$

$$H_2SO_3+\tfrac{1}{2}O_2 \rightarrow H_2SO_4 \quad (4)$$

The leaching experiments were performed in accordance with the Accelerated Leach Test (ALT) procedures: Monolithic Inorganic Leach Test ASTM C 1308. This test method provides a method for accelerating the leaching rate of solidified waste to determine if the release is diffusion-controlled. This test method is applicable to any material that does not degrade, deform, or change leaching mechanism during the test. If diffusion is the dominant leaching mechanism, then the results of this test can be used to model long-term releases from waste forms. The procedures were developed for evaluating the potential leachability from solidified matrices. The test protocol specifies changes in pH medium, temperature, surface area to volume ratio, and testing time. The results obtained included the incremental and cumulative sulfur fraction leached.

Effect of Time and Solution pH

The leaching tests were run at several constant pH values of 4, 7 and 9 to evaluate the influence of pH on the leaching of sulfur and metal oxides from the samples. Universal buffer solutions were used, which were prepared by modifying the method reported by Britton, Hydrogen Ions, 4$^{th}$ Edition Chapman and Hall, 313 (1952), by mixing equal volumes of acids (acetic acid, phosphoric acid, and boric acid) in bottles. The total molarity of the acid mixture was maintained at 0.4 M for the three acids. The desired pHs were reached by mixing the acid mixture with the required amount of 1M sodium hydroxide solution. A constant ionic strength of the three buffer solutions—pH 4, 7 and 9 was maintained and adjusted using a pH meter. The sulfur concrete samples were immersed in a transparent container filled with tested buffer solution. Aliquots were sampled and submitted for ICP analysis to determine the total amount of sulfur and metals leached.

Figure 7:
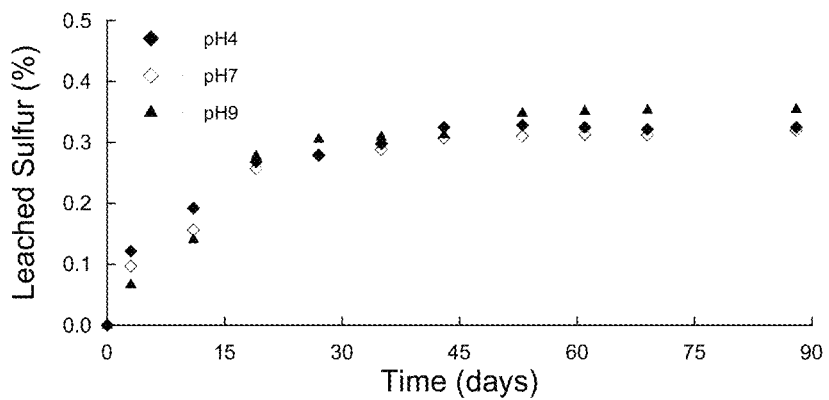
FIG. 7 shows variations in the amount of sulfur leached from concrete samples with time and solution pH.
Figure 8:
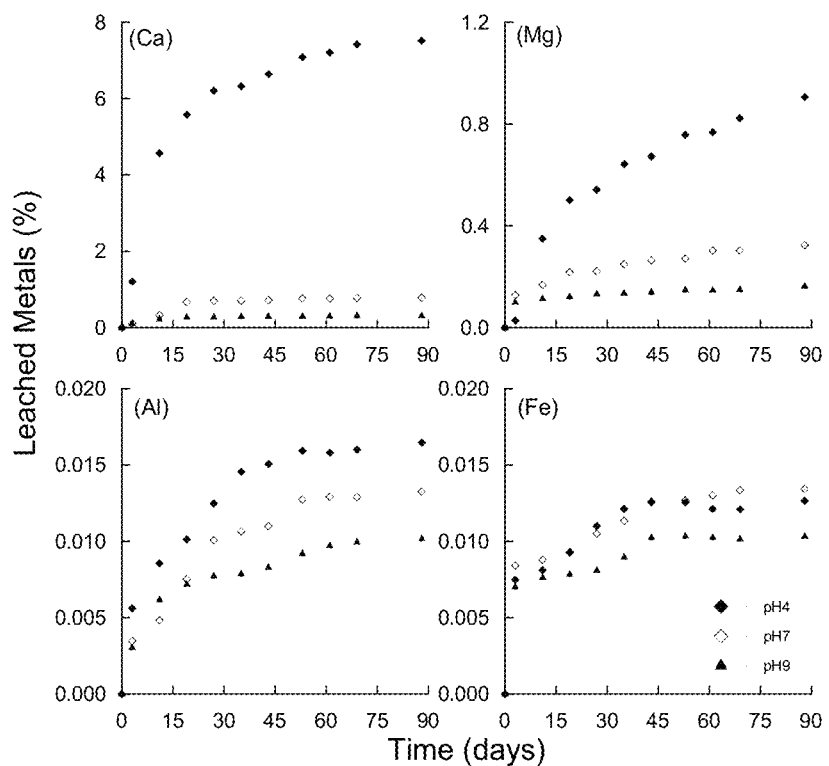
FIG. 8 shows variations in the amount of Ca, Mg, Al, and Fe leached from concrete samples with time and solution pH.

The incremental leaching data as a function of time are shown in FIGS. 7 and 8. The results indicated that:

1. The tests carried out have shown that the leaching rates of sulfur are extremely low irrespective of pH variations in the aqueous environment. The amount of sulfur leached from the solidified matrix in acidic (pH 4), neutral (pH 7), and alkaline (pH 9) mediums is approximately the same, as shown in FIG. 7. This may suggest that the stability of the solidified matrix in an aqueous environment is independent of the pH of the solution; similar results were reported by Sliva et al, "Sulfur Polymer Cement as a Low Level Waste Glass Matrix Encapsulant", PNNL-10947, Pacific Northwest National Laboratory, Richland, Wash., January 1996. A small increase in the amount of sulfur leached with time was observed, but the sulfur released could not overcome the buffer capacity because solution pH was reported to be constant with time.
2. Since materials such as sands and fly ash contain leachable or extractable metallic pollutants it is of prime importance to evaluate the potential leachability of these metal pollutants. The results shown in FIG. 8 indicated that the main leached metal is Ca, with lesser amounts of Mg, Al, and Fe also leached. This could be explained by the electronegativity of these atoms. It is known that different metals have different tendencies to gain electrons. The greater the electronegativity of an atom, the greater its affinity for electrons. The electronegativities of Ca, Mg, Al, Fe, and sulfur are −1.00, −1.55, −1.61, −1.83, and −2.58, respectively.

3. It can be seen from FIG. 8 that irrespective of pH values all curves follow the same trend. Metal ions have lower solubility at alkaline than acidic pH values. Differences in the basic nature of the oxides of these metals may explain the different leaching effects, as discussed below.

a. Many metal oxides react with water to form alkaline hydroxides, e.g., calcium oxide (lime) reacts with water to form calcium hydroxide.

$$\text{Metal oxide} + \text{Water} \rightarrow \text{Metal Hydroxide} \quad (5)$$

$$CaO(s) + H_2O(l) \rightarrow Ca(OH)_2(aq) \quad (6)$$

b. Some metal oxides do not react with water but are basic when they react with acid to form salt and water $$\text{Metal oxide} + \text{Acid} \rightarrow \text{Salt} + \text{water} \quad (7)$$

$$MgO(s) + 2HCl(aq) \rightarrow MgCl_2 + H_2O(l) \quad (8)$$

c. Others exhibit amphoterism, i.e., they react with both acids and bases, like aluminium oxide which dissolves in a strong acid and strong base $$Al_2O_3 + 6H^+ \rightarrow 2Al^{3+} + 3H_2O \quad (9)$$

$$Al_2O_3 + 6OH^- + 3H_2O \rightarrow 2Al(OH)_6^{3-} \quad (10)$$

d. Still others are neutral and non-reactive.

4. The leaching of the metals increased slightly but linearly with time throughout the test period, while the solution pH was buffered at the same pH.

5. The leaching of materials is generally very low because of the low hydraulic conductivity of the solidified matrix. In addition, because of hardening by solidification, metal oxides found in the fly ash are chemically bonded within the matrix since they are converted to less soluble metal sulfides and a small percentage of sulfates (Darnell et al., Full-scale tests of sulfur polymer cement and non-radioactive waste in heated and unheated prototypical containers, EGG-WM-10109, Idaho Natl. Engineering Lab., Idaho Falls, Id., (1992)). This property of transformation of metal oxides to less soluble sulfide forms has also been reported by Mayberry et al, Technical area status report for low-level mixed waste final waste forms, Vol. 1, DOEMWIP-3, Mixed Waste Integrated Program, Office of Technology Development, US Dep. Of Energy, Washington D.C. (1993). These reasons make the sulfur based barriers a good candidate for utilization as a matrix or binder for the immobilization of wastes. Leaching studies indicated that the process of modifying the sulfur minimized or prevented the release of the toxic elements from the solidified matrix.

Effect of Temperature

Figure 9:
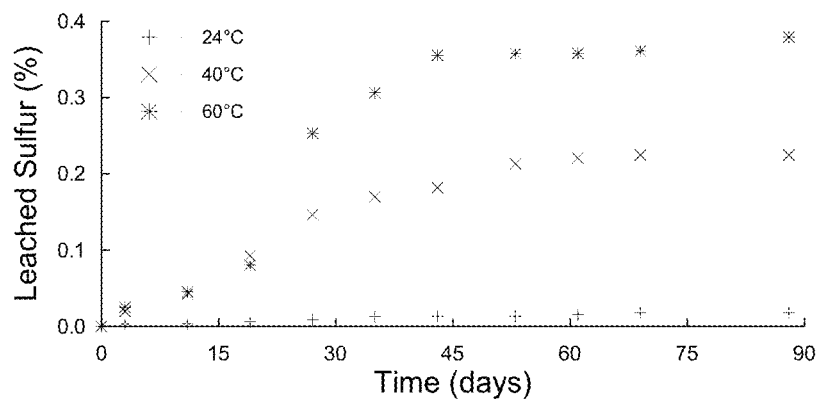
FIG. 9 shows variations in the amount of sulfur leached from concrete samples with time and temperature.

Since temperature is an important factor that greatly influences the rate of leaching of sulfur and metals from solidified matrix, samples were tested in distilled water at temperatures of 24°, 40°, and 60° C. The results shown in FIGS. 9 and 10 highlight the following:

1. The leached sulfur for the case of distilled water at room temperature was of no consequence throughout the test period of 90 days (FIG. 9). This means that the concrete samples were very stable and insoluble in distilled water at room temperature.

2. The materials leached from the concrete samples tested in distilled water were sulfur, Ca, and Mg. Other metals such as Al and Fe were not detected in the leached products.

Figure 10:
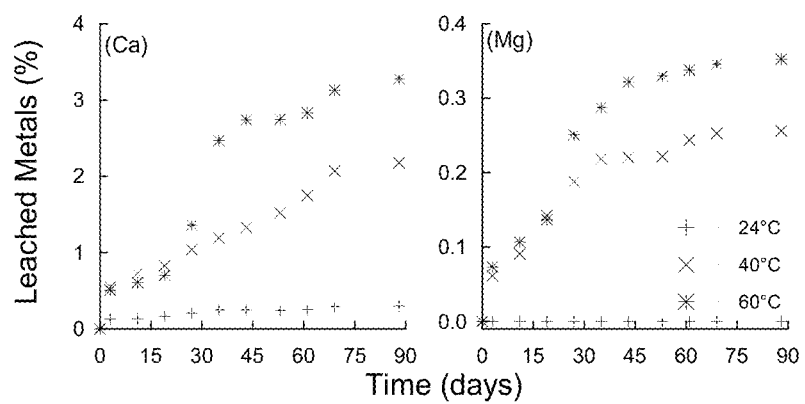
FIG. 10 shows variations in the amount of Ca and Mg leached from concrete samples with time and temperature.

3. The difference in the rate of leaching of materials in distilled water between 24°, 40° and 60° C., was insignificant during the early test period up to 19 days, and gradually increased with time; i.e., the temperature effects were very small and increased slowly with time. With further increases of immersion time, an expected increase in sulfur and metal oxides leached into solution was observed. This was an indication of dependence of the reaction rate of metals in the solidified matrix on temperature and time when immersed in distilled water. The leached rate of metal oxides (Ca and Mg) was insignificant at room temperature, but slightly enhanced with increased temperature as shown in FIG. 10. High temperature accelerated the leaching process because the solubility of metals depends on temperature and increases consequently as temperature increases (Lageraaen et al, Use of recycled polymers for encapsulation of radioactive, hazardous and mixed wastes, BNL-66575, (1997)).

Comparison with Other Cements

Preparation of sulfur cement using elemental sulfur and bitumen, but without a non-ionic surfactant, encountered difficulties because the resulting cement was very brittle.

Figure 12:
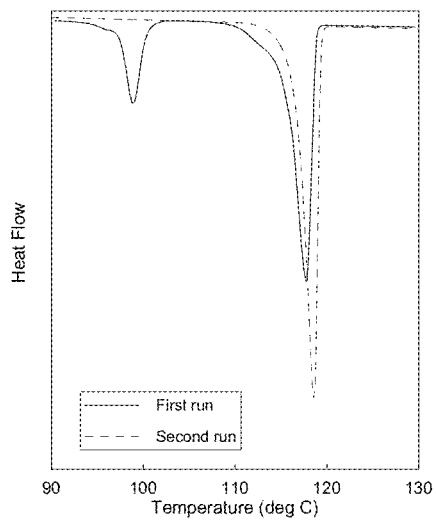
FIG. 12 shows a DSC thermogram for modified sulfur of the present invention.

The modified sulfur of the present invention has sulfur present in the beta (monoclinic) form. Evidence for this is provided in FIG. 12, which is comparable to FIG. 5 from U.S. Pat. No. 4,391,969, which illustrates the DSC for modified sulfur prepared using cyclopentadiene oligomr/dicyclopentadiene. However, it should be noted that the modified sulfur of the present invention leads to superior stability. Thus, concretes prepared using modified sulfur of the present invention has been found to be stable for a period in excess of two years, whereas the maximum reported storage time for that described in U.S. Pat. No. 4,391,969 was six months.

The Examples above demonstrated that the modified sulfur concrete of the present invention is from a thermo-mechanical and hydro-chemical behaviour point of view, suitable for use as a barrier for restricting permeation over a long time period. It could be used for the containment of hazardous waste in arid lands because of (1) its fast hardening, i.e. less than a day; (2) its high strength, i.e. two to three times that of Portland cement concrete; (3) its high resistance to acidic, neutral, and alkaline environments; and (4) the very low leachability of metals from the solidified matrix that is observed for it.

What is claimed is:

1. Modified sulfur which comprises a sulfur component, a mixture of oligomeric hydrocarbons and a non-ionic surfactant wherein the sulfur component comprises 45-65% by weight of monoclinic sulfur and 35-55% by weight of polysulfide, based on the total weight of the sulfur component.

2. Modified sulfur according to claim 1, wherein the surfactant is an alkylphenoxy polyethoxy ethanol.

3. Modified sulfur according to claim 2, wherein the alkylphenoxy polyethoxy ethanol has the average formula $C_rH_{2r+1}(C_6H_4)O(CH_2CH_2O)_sCH_2CH_2OH$, wherein r is from 4 to 8 and s is from 7 to 40.

4. Modified sulfur according to claim 3, wherein, in the average formula, r is 8 and s is 9.

5. Modified sulfur according to claim 1, wherein the surfactant is iso-octylphenoxy polyethoxy ethanol.

6. Modified sulfur according to claim 1, wherein the chemical structure of the surfactant is

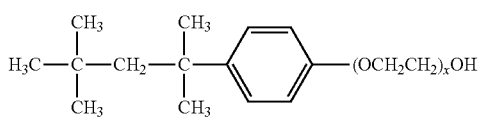

wherein x is 9 to 10.

7. Modified sulfur according to claim 1, wherein the mixture of oligomeric hydrocarbons is bitumen.

8. Modified sulfur according to claim 1, wherein the mixture of oligomeric hydrocarbons is bitumen, and the modified sulfur comprises 95-97.5% by weight of sulfur, and 2.5-5% by weight of the total of bitumen and surfactant components, based on the total weight of the modified sulfur.

9. Modified sulfur according to claim 1, which is obtainable by a process that comprises mixing elemental sulfur, a mixture of oligomeric hydrocarbons and a non-ionic surfactant to produce a mix, and wherein the process comprises subjecting the mix to a temperature of 120-150° C. for 30 minutes to 3 hours.

10. Modified sulfur according to claim 9, wherein the mix cools at a rate of about 1° C. per minute after being subjected to the temperature of 120-150° C. for 30minutes to 3 hours.

11. Modified sulfur cement, which comprises modified sulfur as defined in claim 1 and elemental sulfur.

12. Modified sulfur concrete, which comprises modified sulfur as defined in claim 1, elemental sulfur and an aggregate.

13. Modified sulfur concrete according to claim 12, wherein the aggregate comprises fly ash and/or sand.

14. Modified sulfur concrete, which comprises 20-40% by weight of sand, 25-45% by weight of fly ash, 25-45% by weight of elemental sulfur and 0.25-2% by weight of modified sulfur wherein the modified sulfur comprises sulfur, a mixture of oligomeric hydrocarbons and a non-ionic surfactant.

15. Modified sulfur concrete according to claim 12, which is obtainable by a process of mixing an aggregate with the elemental sulfur and modified sulfur to produce a mixture.

16. Modified sulfur concrete comprising modified sulfur, elemental sulfur and an aggregate, wherein the modified sulfur comprises sulfur, a mixture of oligomeric hydrocarbons and a non-ionic surfactant; and the modified sulfur concrete is obtainable by a process of mixing an aggregate with the elemental sulfur and modified sulfur to produce a mixture, which process comprises mixing 20-50% by weight of the elemental sulfur, 50-80% by weight of the aggregate and 0.1-0.5% by weight of the modified sulfur, based on the total weight of the concrete.

17. Modified sulfur concrete according to claim 15, wherein the process comprises subjecting the mixture to a temperature of 130-150° C. for 30 minutes to 2hours.

18. Modified sulfur concrete according to claim 15, wherein the process comprises mixing together (i) the aggregate which has been pre-heated to a temperature of 170-180° C., and (ii) a mixture of the elemental sulfur and modified sulfur, which mixture has been pre-heated to a temperature of 130-150° C., and then subjecting the mixture of (i) and (ii) to a temperature of 130-150° C. for 20-40 minutes, casting the resulting mixture into molds and allowing it to cool.

* * * * *